United States Patent [19]

Naruto

[11] Patent Number: 4,634,942
[45] Date of Patent: Jan. 6, 1987

[54] APPARATUS FOR CONTROLLING ELECTRIC CARS

[75] Inventor: Masashi Naruto, Osaka, Japan

[73] Assignee: Mitsubishi Denki Kabushiki Kaisha, Tokyo, Japan

[21] Appl. No.: 792,246

[22] Filed: Oct. 30, 1985

Related U.S. Application Data

[63] Continuation of Ser. No. 589,779, Mar. 15, 1984, abandoned.

[30] Foreign Application Priority Data

Mar. 25, 1983 [JP] Japan ................................. 58-50914

[51] Int. Cl.$^4$ ............................................. H02P 5/16
[52] U.S. Cl. ................... 318/338; 318/345 C; 318/375
[58] Field of Search ............... 318/336, 338, 300, 296, 318/375, 376, 345 C

[56] References Cited

U.S. PATENT DOCUMENTS 4,322,667 3/1982 Ohba .................................. 318/338

FOREIGN PATENT DOCUMENTS 0970618 10/1982 U.S.S.R. ............................. 318/338

OTHER PUBLICATIONS

"Automatic Variable-Field Chopper-Control Equipment for Teito Rapid Transit Authority's Yurakucho Line", M. Ashiya et al., Mitsubishi Electric Engineer, June 1974, pp. 36–42.
"New Standard Thyristor Chopper Controlled Cars with Regenerative Braking", esp. p. 33, section 5.3, Mutually Coupled Main Smoothing Reactors, T. Kitaoka et al., Mitsubishi Denki Engineer, Mar. 1972, pp. 28–35.

Primary Examiner—B. Dobeck
Attorney, Agent, or Firm—Leydig, Voit & Mayer

[57] ABSTRACT

Apparatus for controlling d-c shunt motors of electric cars utilizes first chopper circuits connected in series with the armatures of the d-c motors for controlling armature currents upon receipt of a first set of control signals and second chopper circuits connected in series with the field windings of the d-c shunt motors for controlling the field currents responsive to a second set of control signals, reactors having first and second coils, the first coils being connected in series with the armatures and the second coils being connected in series with the field windings, with the first and second coils magnetically coupled together to maintain a relationship that the field currents decrease with a decrease in the armature currents.

5 Claims, 4 Drawing Figures

APPARATUS FOR CONTROLLING ELECTRIC CARS

This application is a continuation of application Ser. No. 589,779, filed 3-15-84, now abandoned.

BACKGROUND OF THE INVENTION

The present invention relates to an apparatus for controlling electric cars which are provided with d-c shunt motors as drive motors, and particularly to a control apparatus employing choppers.

Conventional apparatus for controlling electric cars using choppers generally include systems employing a field chopper and d-c compound motors, and systems employing a chopper and d-c series motors. With the former systems employing compound motors, however, the motors are cumulatively connected or differentially connected to exhibit different characteristics with series field and shunt field in the powering condition and regenerative condition. Further, since the armature circuit is controlled by resistors, a cam-type controller must still be employed. With the latter systems on the other hand, a switching device is required for switching the powering and braking, and for switching the forward running and backward running. Further, it is not allowed to continuously control the field, and the motor voltage must be maintained to be smaller than a voltage of stringing (power source) during the regenerative breaking condition. Therefore, it is not possible to stably control the braking when running at high speeds.

In order to solve such problems, there has been disclosed and proposed in the previously field U.S. patent application Ser. No. 451,651 a new apparatus for controlling electric cars employing d-c shunt motors as drive motors.

According to the above-proposed apparatus for controlling electric cars, the field circuit controls both the forward rotation and the reverse rotation, the armature circuit controls a chopper which is provided in series with the armature to control the armature current at the time of acceleration in a region where the armature voltage is lower than the stringing (power source) voltage, and selects and controls the chopper in the field circuit in a region where the armature voltage is nearly equal to, or greater than, the stringing voltage. Further, the chopper in the armature circuit works to balance the unbalanced current among the circuits of electric motors. Thus, it is made possible to employ shunt motors for driving the electric cars. Accordingly, it is possible to switch the forward running and backward running, as well as to switch the powering and braking, by the field circuit. Further, even when the armature voltage becomes equal to or higher than the stringing (power source) voltage during the regenerative braking condition, the regenerative brake can be effectively applied by the field control.

Even the above-mentioned control apparatus, however, presents a problem as described below. That is, with the apparatus for controlling electric cars, the system for controlling armature currents and field currents must be within the main circuit limits and must remain stable. The above control apparatus, however, has shunt characteristics in which the armature current drops with respect to the axis of speed under the condition where a constant current flows through the chopper of the armature. Therefore, it is virtually impossible to select the constants of the system. It can therefore be contrived to relax the shunt characteristics by inserting a resistance in series with the armature. According to this method, however, heat loss increases due to resistance.

SUMMARY OF THE INVENTION

A first object ot the present invention is to provide an apparatus of the chopper type for controlling electric cars, which features increased freedom of control and increased stability.

A second object of the present invention is to provide an apparatus for controlling electric cars employing d-c shunt motors, which is capable of efficiently performing the control operation maintaining quick response characteristics without the need of inserting a resistance in series with the armatures.

According to the apparatus for controlling electric cars of the present invention, armature currents of d-c shunt motors are controlled by a chopper, and field currents of said motors are controlled by a field chopper, wherein a reactor is constituted by first coils and second coils, wherein said first coils are connected in series with the armatures of said motors, said second coils are connected in series with field windings of said motors, and said first coils and said second coils are magnetically coupled together maintaining such a relation that the field currents decrease with the decrease in the armature currents.

DESCRIPTION OF THE PREFERRED EMBODIMENT

Figure 1:
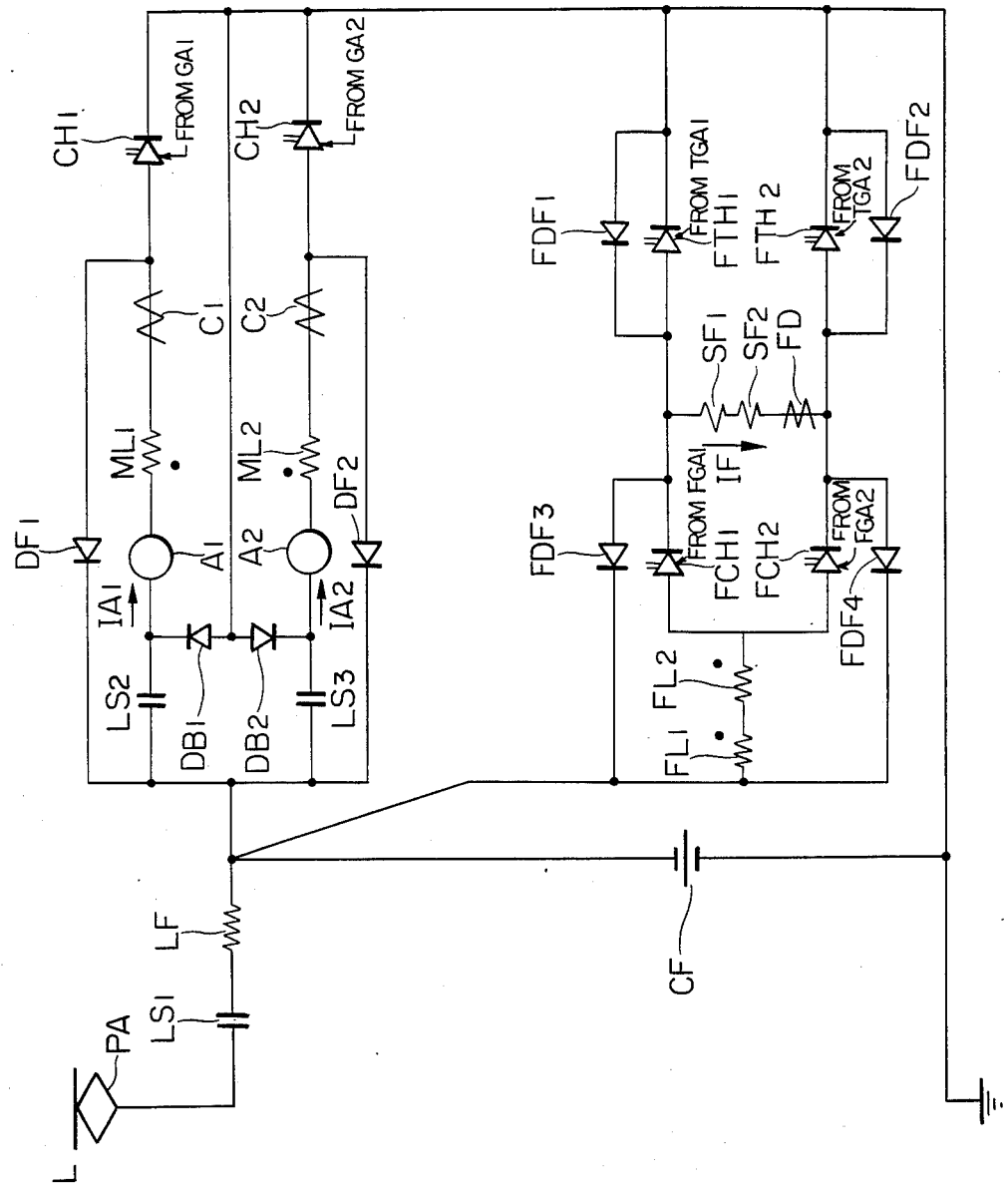
FIG. 1 is a diagram of a main circuit according to an embodiment of the present invention.

The invention will be described below in conjunction with the drawings. In FIG. 1, symbol L denotes a power line for supplying electric power to an electric car, PA denotes a pantagraph, symbols $LS_1$, $LS_2$ and $LS_3$ denote line breakers, LF denotes a filter reactor, CF denotes a filter capacitor, $A_1$ and $A_2$ denote armatures of first and second shunt motors, $ML_1$ and $ML_2$ denote first coils which constitute a reactor and which are connected in series with the armatures $A_1$, $A_2$, respectively, to smooth the armature currents, $CH_1$ and $CH_2$ denote chopper for controlling armature circuits of the first and second shunt motors, $C_1$ and $C_2$ are current detectors for detecting electric currents $IA_1$ and $IA_2$ that flow into the armatures $A_1$, $A_2$ respectively. Aymbols $DF_1$ and $DF_2$ denote flywheel diodes for the choppers $CH_1$, $CH_2$, cymbols $DB_1$, $DB_2$ denote diodes for allowing the armature currents to flow during the regenerative braking operation. Symbols $SF_1$ and $SF_2$ denote field windings of the first and second shunt motors, $FCH_1$ and $FCH_2$ denote choppers for conrolling electric currents following into the field windings $SF_1$, $SF_2$, symbols $FTH_1$ and $FTH_2$ denote thyristors also serving as second chopper circuits for controlling electric current in the field windings $SF_1$ and $SF_2$, symbols $FDF_1$, $FDF_2$, $FDF_3$ and $FDF_4$ denote flywheel diodes, FD denotes a current detector which detects the field current IF, symbols $FL_1$ and $FL_2$ denote second coils which are provided for the above-mentioned reactors, which are magnetically coupled to the above-mentioned first coils $ML_1$, $ML_2$ and which are further connected to the field circuits, and symbol CF denotes a filter capacitor. In the operation of the control apparatus, armature currents are controlled by a first set of control signals directed to the first chopper circuits $CH_1$ and $CH_2$, and field winding currents are controlled by a second set of control signals directed to the second chopper circuits $FCH_1$, $FCH_2$, $FTH_1$, and $FTH_2$.

The circuit operates as described below. Shunt motors consisting of $A_1$, $SF_1$ and $A_2$, $SF_2$ are used as main motors. When operating in the forward direction, the field current IF is supplied in the forward direction through a circuit consisting of $L$-$PA$-$LS_1$-$LF$-$FL_1$-$FL_2$-$FCH_1$-$SF_1$-$SF_2$-$FD$-$FTH_2$. When the chopper $FCH_1$ is turned off, the field current IF refluxes through a circuit consisting of $SF_1$-$SF_2$-$FD$-$FTH_2$-$FDF_1$. Namely, the chopper action is produced by $FCH_1$, $FTH_2$ and $FDF_1$ to control the field current. This operation also holds true even when the electric car is running backwardly by inverting the armature voltage (e.g., when the braking is to be applied at low speeds while running backwardly). In the case of powering in the backward direction, the electric current is similarly supplied in the reverse direction through the circuit consisting of $FCH_2$-$FD$-$SF_2$-$SF_1$-$FTH_1$. When the chopper $FCH_2$ is turned off, the field current IF flows through the circuit consisting of $SF_2$-$SF_1$-$FTH_1$-$FDF_2$-$FD$. This operation also holds true even when the armature voltage is to be inverted while running in the forward direction (e.g., when the regenerative braking is to be applied at low speeds while running in the forward direction). On the other hand, when the current of the electric car which is being powered is to be controlled by the armature circuit (the armature voltage assumes forward polarity), the electric current is supplied through the circuits consisting of $LS_2$-$A_1$-$ML_1$-$C_1$-$CH_1$ and $LS_3$-$A_2$-$ML_2$-$C_2$-$CH_2$. When the choppers $CH_1$, $CH_2$ are turned off, the electric current is refluxed through the circuits consisting of $A_1$-$ML_1$-$C_1$-$DF_1$-$LS_2$ and $A_2$-$ML_2$-$C_2$-$DF_2$-$LS_3$.

By turning the choppers $CH_1$, $CH_2$ on and off, it is possible to control the armature currents $IA_1$, $IA_2$. When the brake current (the armature voltage assumes reverse polarity) of the electric car is to be controlled, the line breakers $LS_2$ and $LS_3$ are turned off. When the choppers $CH_1$, $CH_2$ are turned on, the current is permitted to flow through the circuits consisting of $DB_1$-$A_1$-$ML_1$-$C_1$-$CH_1$ and $DB_2$-$A_2$-$ML_2$-$C_2$-$CH_2$. When the choppers $CH_1$, $CH_2$ are turned off, the current flows through the circuits consisting of $DB_1$-$A_1$-$ML_1$-$C_1$-$DF_1$ and $DB_2$-$A_2$-$ML_2$-$C_2$-$DF_2$. The armature currents $IA_1$, $IA_2$ are controlled by turning the choppers $CH_1$, $CH_2$ on and off.

The motor voltage has forward polarity, When the motor voltage is equal to, or higher than, the line voltage, the line breakers $LS_2$, $LS_3$ remain conductive, and the armature currents $IA_1$, $IA_2$ flow in the reverse direction through the circuits consisting of $CH_1$ flowing current)—$C_1$-$ML_1$-$A_1$-$LS_2$ and $CH_2$-$C_2$-$ML_2$-$A_2$-$LS_3$. In this case, the armature currents $IA_1$, $IA_2$ are controlled by controlling the intensity of armature voltage by the field choppers $FCH_1$, $FCH_2$.

Figure 2:
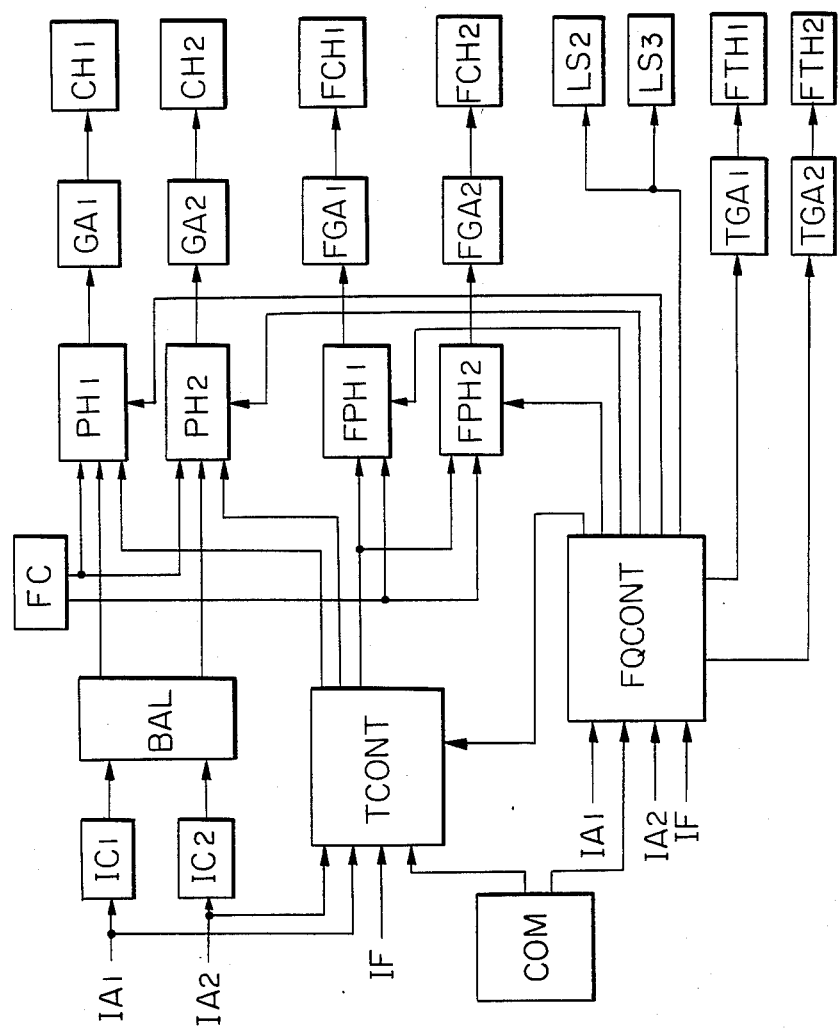
FIG. 2 is a block diagram showing a control circuit for controlling the main circuit of FIG. 1.

FIG. 2 illustrates a control circuit for controlling the main circuit, according to an embodiment of the present invention. In FIG. 2, symbol $IC_1$ denotes a level converter for converting the level of detected current of the armature $A_1$, $IC_2$ denotes a level converter for converting the level of detected current of the armature $A_2$, BAL denotes a current controller which detects unbalance in the outputs of the converters $IC_1$, $IC_2$, and which so works that the armature currents $IA_1$, $IA_2$ are balanced. Symbols $PH_1$, $PH_2$ denote phase control circuits which control the armature currents $IA_1$, $IA_2$ by controlling timming signals of the choppers $CH_1$, $CH_2$ of FIG. 1, $T_{CONT}$ denotes a torque control device which controls the torque or the braking force as instructed by comparing the values detected by the current detectors $C_1$, $C_2$ and FD with the torque or the braking force instructed by an operation control unit COM, and which sends suitable instruction to $PH_1$, $PH_2$, $FPH_1$ and $FPH_2$. Symbol $FPH_1$ denotes a phase controller which controls the chopper $FCH_1$ of FIG. 1 to control the intensity of field current IF. Symbol $FPH_2$ denotes a phase controller which controls the chopper $FCH_2$ of FIG. 1 to control the intensity of field current IF, and which performs its operation upon receipt of an instruction from a four-quadrant controller FQCONT. Symbol COM denotes an operation controller which instructs the torque (or the braking force) of the shunt motors relying upon an instructed speed and an actual speed, and which also instructs an operation mode such as forward running and backward running. The four-quadrant controller FQCONT selects operations of the $T_{CONT}$, $PH_1$, $PH_2$, $FPH_1$, $FPH_2$, $TGA_1$, $TGA_2$, $LS_2$ and $LS_3$ responsive to quadrants shown in FIG. 3 relying upon the instructions from the operation controller COM and the actual currents $IA_1$, $IA_2$, IF, and the like, and gives suitable instruction to those which are selected. Although the COM and controllers are described being separated from each other, they may be combined together. Symbols $GA_1$, $GA_2$, $FGA_1$, $FGA_2$, $TGA_1$, $TGA_2$ denote gate amplifiers with apply suitable pulse signals to the choppers $CH_1$, $CH_2$, $FCH_1$, $FCH_2$ and thyristors $FTH_1$, $FTH_2$. Symbol FC denotes an oscillator which produces an operation frequency for the choppers $CH_1$, $CH_2$, $FCH_1$, $FCH_2$.

By the thus constructed circuit, the main circuit shown in FIG. 1 can be controlled to operate in accordance with a variety of operation modes.

Figure 3:
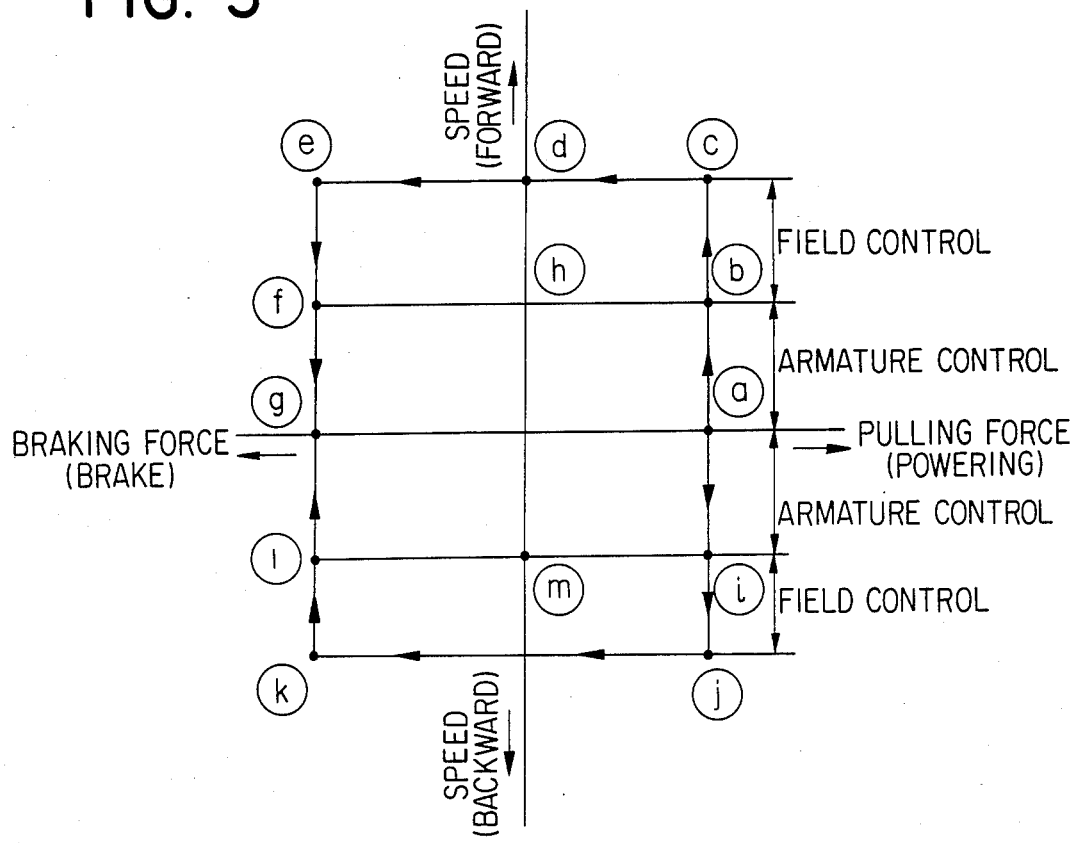
FIG. 3 is a characteristics diagram illustrating the operation modes of FIG. 1.

FIG. 3 is a characteristics diagram in which operation of the present invention is shown for various operation modes of control of an electric car. There are four modes of operation of the electric car as shown in FIG. 3. That is, forward powering, forward braking, backward braking and backward powering. In FIG. 3, the pulling force (braking force) is drawn along the abscissa, and the speed (forward and backward) is drawn along the ordinate to describe characteristics along the two axes; i.e., the characteristics are divided into four quadrants. According to the present invention, the control can be effected continuously over the four quadrants.

At the time of starting, the electric car is controlled to produce a constant torque (to be accelerated at a constant rate). At this time, the field currents are controlled to remain nearly constant except during the transient condition, and the armature currents are also controlled to remain constant by the choppers $CH_1$, $CH_2$ as the armature voltage increases with the increase in speed (section (a)→(b) in FIG. 3). As the outputs of the choppers $CH_1$, $CH_2$ approach nearly the line voltage (point (b) in FIG. 3), the choppers $CH_1$, $CH_2$ are operated by correction control (only when it is required) for armature currents $IA_1$, $IA_2$, that results from voltage unbalance between the armatures $A_1$ and $A_2$. The field current IF is controlled by the chopper $FCH_1$ to cover the control from the point (b) to a point (c) in FIG. 3. Since the operation speed has been instructed by an operator, the field current IF is controlled so as to maintain a nearly constant speed. With the circuit of FIG. 1, in this case, the line breakers $LS_1$, $LS_2$, $LS_3$ are turned on, the diodes $DB_1$, $DB_2$, $FDF_2$, $FDF_4$ and the chopper $FCH_2$ are turned off, and the field currents are controlled by the choppers $CH_1$, $CH_2$ and $FCH_1$. When operating at a constant speed, and when a breaking current required because of running a gradient, the operation point of FIG. 3 shifts from the section of point (c)→point (d) to the section of point (d)→point (e). Namely, the control is continuously performed with a strong field system without switching the circuit. When the electric car must be decelerated, the control is effected over a section of point (e)→point (f); i.e., the electric car is decelerated. Even in this case, the field current is simply increased, so that the main circuit of FIG. 1 undergoes the same operation mode. That is, the braking current flows through, for example, the circuit consisting of $CH_1$-$C_1$-$ML_1$-$A_1$-$LS_2$ of FIG. 1. When the operator has instructed to apply the brake to stop the electric car, i.e., when the operator has instructed the speed between a point (f) and a point (g) in FIG. 3, the operation point comes to a section between the point (f) and a point (h). The line breakers $LS_2$, $LS_3$ are then turned off, the field choppers $FCH_1$ and $FTH_2$ are turned off to turn the chopper $FCH_2$ on and off, and the thyristor $FTH_1$ is turned on to allow the field current to flow in the reverse direction, thereby to reverse the voltage of the armatures $A_1$, $A_2$. The armature currents $IA_1$, $IA_2$ are then allowed to flow through the circuits of

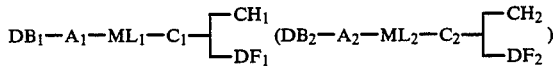

to effect the control from point (f) to point (g) in FIG. 3 while maitaining the same braking current (braking force), so that the electric car comes to a halt. The brake can be effectively applied to cover a lower speed if the choppers $CH_1$, $CH_2$ are short-circuited just before the electric car comes to a halt and if the field current IF is controlled to establish a strong field.

Even when the backward powering is instructed, the armature circuit operates nearly in the same manner as the case of forward powering and forward braking, with the exception that the field current is controlled by using the circuit consisting of $FCH_2$-$FD$-$SF_2$-$SF_1$-$FTH_1$. Namely, the control is effected from point (a) to point (i), point (i) to point (j), point (j) to point (k), point (k) to point (l), point (l) to point (g) (point (l) to point (m)). Namely, the brake is applied to stop the electric car passing through the modes of powering and the constant-speed operation. Running in the forward direction and in the backward direction makes a difference only with regard to that the field current flows in the opposite directions depending upon the powering and braking, and the armature voltage assumes the positive polarity. Therefore, details are not described here.

A method for controlling the forward operation mode will be described below in detail in conjunction with FIG. 4.

(1) During the powering, the line breakers $LS_1$ to $LS_3$ are turned on to constitute a powering circuit. The chopper $FCH_1$ is then turned on so that the field current will flow in the forward direction, and the timing signals of the chopper $FTH_2$ is controlled to adjust the flow rate of electric current. The armature currents are controlled by the choppers $CH_1$, $CH_2$, as a matter of course.

Figure 4:
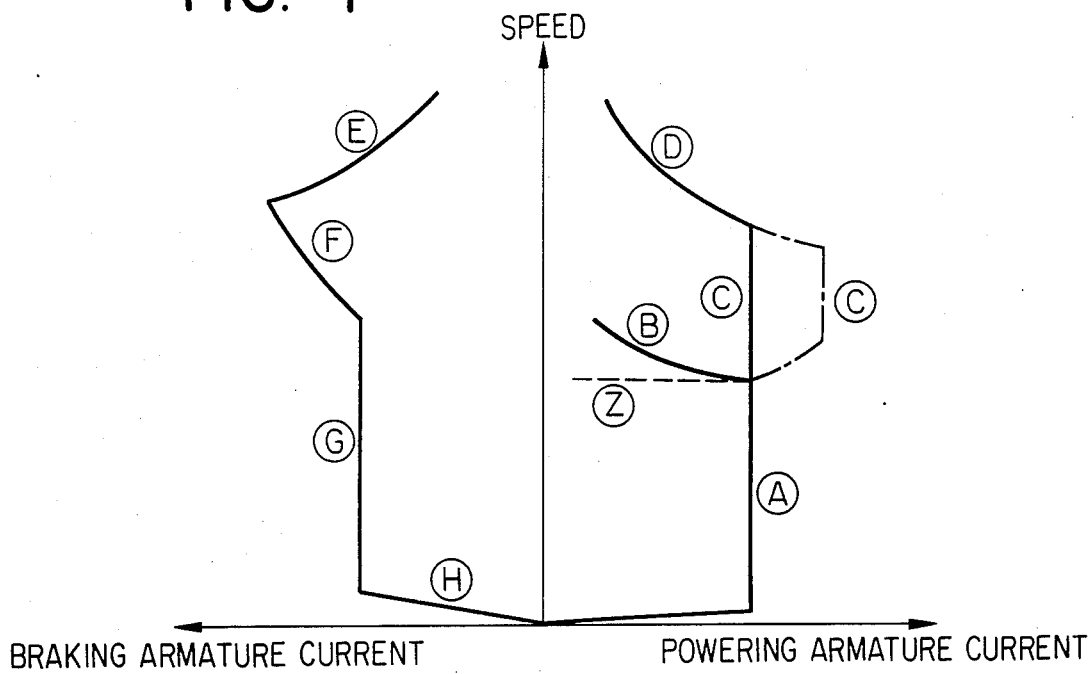
FIG. 4 is a diagram of characteristics curves in the forward operation modes.

(2) A constant acceleration is accomplished by controlling the field current to remain at a predetermined constant value by the chopper $FTH_2$, and by controlling the armature currents by the choppers $CH_1$, $CH_2$ to remain at a predetermined constant value as represented by (A) in FIG. 4. In this case, the timing signals of the choppers $CH_1$, $CH_2$ change from minimum to maximum, and whereby the armature voltage is controlled.

(3) As the timing signals of the choppers $CH_1$, $CH_2$ become maximum so that line voltage of the electric car is applied to the armature $A_1$, $A_2$, the field current is gradually decreased to maintain the armature current constant as represented by (C) in FIG. 4. This weakens the field system to decrease the pulling force. The speed, however, increases further.

Here, if there exists a margin in the current capacity of armatures $A_1$, $A_2$, the field system is weakened within that range, and the armature current can be increased as represented by (C') in FIG. 4 to produce a constant pulling force.

(4) When the field current is reduced to a permissible limit of the motors, the field current is fixed at that value, to enter into the mode of the final characteristics of powering as represented by (D) in FIG. 4. To product these characteristics, the control is often effected maintaining constant the ratio of armature current to field current, i.e., maintaining constant the ratio of armature current to field current factors at a permissible limit value.

When the operator has instructed a low-speed notch, the operation mode enters from the region of constant acceleration represented by (A) into the characteristics represented by (B). Here, although the timing signals of the armature choppers are reaching a maximum value, the field current is maintained at the same ratio as that of the region (A) relative to the armature current (as related to the field current factors). That is, the field current is reduced in proportion to the decrease of armature current maintaining the same field current factor as that the region (A).

(5) When the powering instruction is received no more, the line breakers $LS_1$ to $LS_3$ are opened to enter into the coasting mode.

(6) When the braking instruction is issued, the line breaker $LS_1$ is closed to constitute a braking circuit. In the high-speed region, the timing signals of the choppers $CH_1$, $CH_2$ are fixed at minimum values, and the field current is adjusted by the choppers $FTH_1$, $FTH_2$, to perform regenerative control with the braking force maintained constant as represented by (F) in FIG. 4. Here, the characteristics (E) represent the weakest field system that exists as a result of selecting rated characteristics of the main motors, and in which the timing signals of the armature choppers are minimum. The ordinary operation is carried out in a speed region which is lower than this region. Depending upon the case, however, the electric braking force also decreases by an amount by which the armature currents are decreased, in the high-speed running mode.

(7) As the field current reaches a predetermined value as a result of deceleration, the field current is fixed to start the control of current flow factors of the choppers CH₁, CH₂. In this mode, the armature currents are maintained constant as represented by (G) in FIG. 4, and a constant braking force is produced.

(8) As the timing signals of the choppers CH₁, CH₂ reach maximum values, the armature currents decrease as represented by (H) in FIG. 4, and the braking force decreases. Therefore, the braking force is supplemented by a second brake such as air brake or the like, which, however, is utilized in a narrow region only just before the electric car comes to a halt. Here, to further increase the range in which the regenerative brake can be effectively applied, the field system is often intensified within an allowable limit.

In the above-mentioned control system, however, the timing signals of the choppers CH₁, CH₂ become maximum at points where the mode changes from (A) to (B), or from (A) to (C) or (C') in FIG. 4. Generally, however, the shunt field winding has a relatively large time constant, and the magnetic flux cannot be quickly changed. That is, the control system is dominated by the shunt characteristics ((Z) in FIG. 4), so that armature currents change suddenly and greatly at a speed determined by the shunt characteristics. This fact becomes a large input deviation to the field current control system which is to realize the characteristics of (B) or (C) or (C') relying upon the control cirduit of FIG. 2. If the field control system and the field main circuit have sufficiently quick response characteristics, the control of B or C or C' can be stably carried out. In practice, however, since at least the field main circuit exhibits a slow response speed as mentioned above, the correction control quantity becomes too great, causing excessive armature currents to flow. Consequently, a large oscillating current flows. With the shunt characteristics in which the armature current characteristics drop relative to the axis of speed under the condition where the timing signals of armature choppers is maintained constant, it is very difficult to select constants for forming a stable control system.

To eliminate the above-mentioned problems according to the control apparatus of the present invention, therefore, the reactors connected in series with the armatures A₁, A₂ are divided into first coils ML₁, ML₂ and second coils FL₁, FL₂ as shown in FIG. 1, the first coils ML₁, ML₂ and the second coils FL₁, FL₂ are magnetically coupled together, polarities of the first coils ML₁, ML₂ and the second coils FL₁, FL₂ of the reactors maintaining such a relation as diagramed, i.e., maintaining such a relation that the field currents decrease with the decrease in the armature currents, and the numbers of turns of the coils are so selected as to match the respective ratings. Then, by directly coupling the main circuit, it is possible to quickly perform such functions as decrease of armature currents→weakening of field system→increase of armature currents, and it is allowed to realize a very stable control. The stability of this system can be comprehended from the fact that it is equivalent to controlling the powering of cumulative compound motors.

The coupling reactors need induce a suitable voltage on the side of the field system responsive to a large di-dt of armature currents. Therefore, the inductances need be small and, hence, the reactors need be small. In particular, when the operation is not to be carried out at high frequencies, the coils ML₁, ML₂ that serve as smoothing reactors may be formed together with the coils FL₁, FL₂ as a unitary structure, making it possible to construct the device in a compact size without increasing the weight thereof.

According to the present invention as described above, the first and second coils are magnetically coupled together, the first coils being connected in series with the armatures of the motors, and the second coils being connected in series with the field systems. Further, the first coils and the second coils are magnetically coupled together in such a relation than the field currents decrease with the decrease in the armature currents. Thus, the invention realizes an apparatus which is capable of efficiently controlling the electric cars maintaining increased stability and quick response characteristics.

What is claimed is:

1. An apparatus for controlling electric cars comprising:
   d-c shunt-wound motors adapted to be connected to a d-c source and having armatures and field windings;
   first chopper circuit means connected in series with the armatures of said d-c shunt-wound motors and controlling the flow of armature currents in both directions upon receipt of timing signals;
   second chopper circuit means connected in series with the field windings of said d-c shunt-wound motors and controlling the flow of field currents in both directions upon receipt of timing signals;
   reactors having first and second coils, the first coils being connected in series with said armatures, the second coils being connected in series with said field windings, and said first coils and second coils being magnetically coupled together maintaining such a relation that said field currents decrease with the decrease in said armature currents.

2. An apparatus for controlling electric cars according to claim 1, wherein said first coils of said reactors have a function to smooth the armature currents.

3. An apparatus for controlling electric cars comprising:
   a plurality of d-c- shunt-wound motors having armatures connected in parallel with a power source;
   first chopper circuit means respectively connected in series with said armatures for controlling the flow of armature currents in both directions upon receipt of timing signals;
   field windings of said d-c- shunt-wound motors, said field windings being connected in series with the power source;
   second chopper circuit means connected in series with said field windings for controlling the flow of field currents in both directions upon receipt of timing signals; and
   a plurality of reactors, each having first and second coils, each of said first coils being connected in series with a corresponding one of said armatures, respectively, said second coils being connected in series with each other and with said plurality of field windings, and said first coils and second coils being magnetically coupled together maintaining such a relation that the field currents decrease with the decrease in the armature currents.

4. An apparatus for controlling electric cars according to claim 3, wherein the said coils in said plurality of reactors have a function to smooth the armature currents.

5. An apparatus for controlling electric cars comprising:

a plurality of d-c shunt-wound motors including first and second motors having armatures and field windings;

first and second armature circuit means connecting said armatures of said first and second motors in parallel including line breaker means connected in series with each armature and adapted to control current flow through the respective armature, and a circuit including a diode in parallel with each armature;

first chopper circuit means including first choppers respectively connected in series with said armatures and selectively operable for controlling the flow of armature currents in both directions in each armature;

field circuit means connecting said field windings of said first and second motors in a series circuit which is in parallel with both said armatures;

second chopper circuit means including second choppers connected in series with said field windings and alternately operable in pairs for controlling the flow of field currents in both directions in said field windings; and a plurality of reactors, each having first and second coils, circuit means connecting each of said first coils in series with a corresponding one of said armatures and a first chopper, respectively, circuit means connecting said second coils in series with each other and with said plurality of field windings and said pairs of said second choppers, and said first coils and second coils being magnetically coupled together maintaining such a relation that the field currents decrease with a decrease in the armature currents.

* * * * *